United States Patent [19]

Altonji et al.

[11] 3,877,069

[45] Apr. 8, 1975

[54] SKEW CORRECTION SYSTEM

[75] Inventors: Edmund R. Altonji, Pequannock, N.J.; Dale Horelick, Menlo Park, Calif.

[73] Assignee: The United States of America as represented by the Secretary of the Navy, Washington, D.C.

[22] Filed: Nov. 26, 1963

[21] Appl. No.: 326,304

[52] U.S. Cl. .................................. 360/26; 35/10.4
[51] Int. Cl. .......................... G09b 9/00; G11b 5/02
[58] Field of Search .................. 35/10.4; 343/100.1; 340/174.1; 179/100.1; 360/26

[56] References Cited

UNITED STATES PATENTS

| | | | |
|---|---|---|---|
| 2,751,439 | 6/1956 | Burton | 340/174.1 B |
| 2,937,239 | 5/1960 | Garber | 340/174.1 B |

*Primary Examiner*—Malcolm F. Hubler
*Attorney, Agent, or Firm*—R. I. Tompkins; L. S. Epstein

EXEMPLARY CLAIM

1. An electronic skew correction system, comprising in combination;

recording means and playback means, said recording means having a capability of receiving and storing information in a multiplicity of information channels and said playback means having an ability for reproducing said stored information, information storage means, said information storage means being operatively connected to said recording and playback means for storage of information on a multiplicity of information channels, synchronizing means, operatively connected to said recording and playback means, synchronizing signal generating means, said synchronizing signal generating means being operatively connected to said recording means whereby said synchronizing signal generating means generates synchronizing signals for storage upon said information storage means, and phase shift control means, said phase shift control means being operatively to said playback means for control of the information reproduced from the information stored on said storage means whereby said phase shift control means vary the various channel phase relations of the information reproduced, and wherein said synchronizing generator means includes, a sine wave oscillator, and phase shift means, said sine wave oscillator being connected to generate a reference sine wave signal for recording onto one of the external information channels of said tape information storage means, and said phase shift means being operatively connected to said reference signal generating means for shifting the phase of said reference signal for the production of equal amplitude signals ninety degrees out of phase with said reference signal for recording on another one of the external channels of said information storage recording means.

5 Claims, 1 Drawing Figure

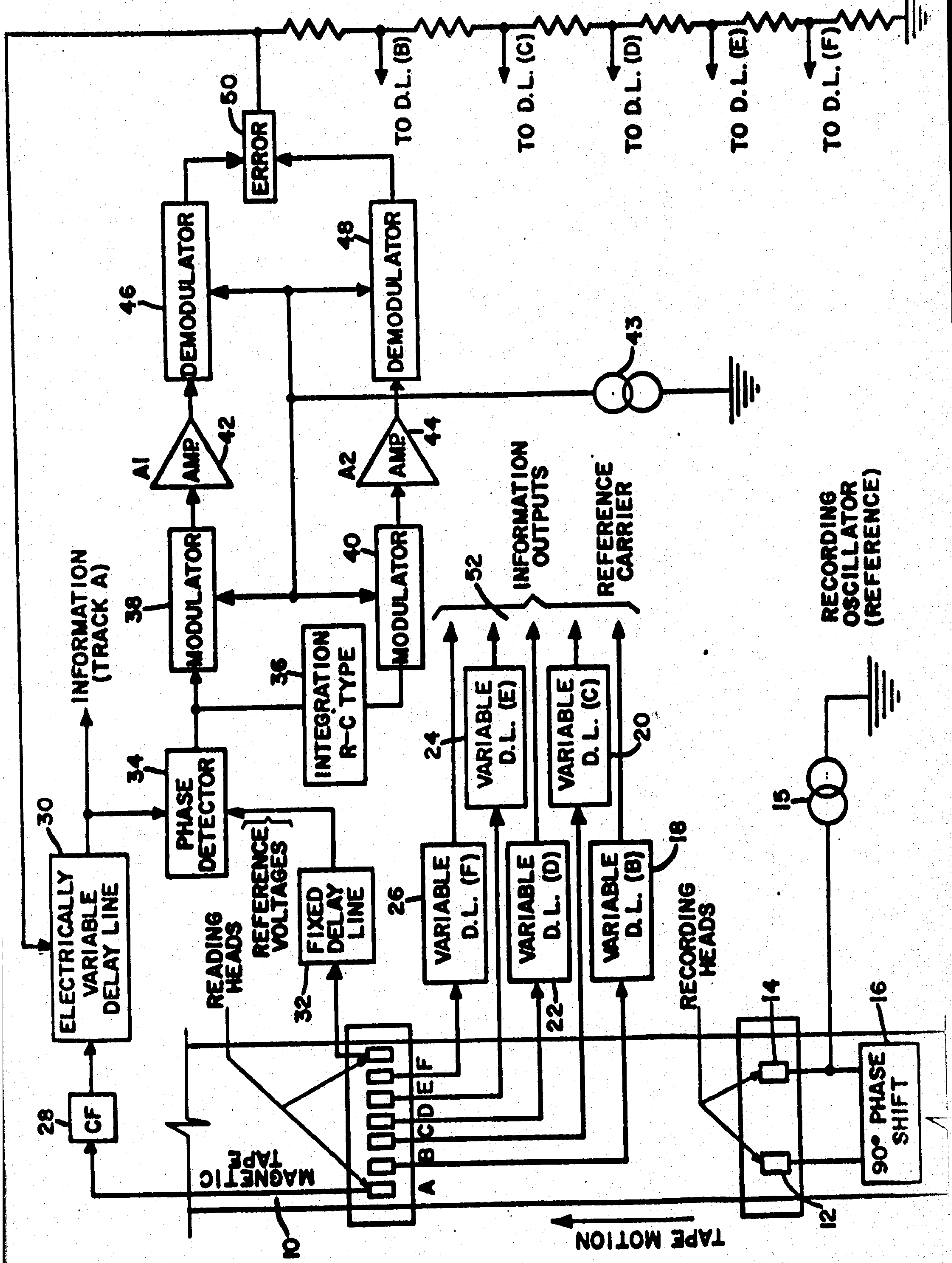
INVENTORS
EDMUND R. ALTONJI
DALE HORELICK

SKEW CORRECTION SYSTEM

The present invention relates to a skew correction system for use in training devices and is particularly directed towards an electronic skew correction system for maintaining exact phase relation between two or more information channels.

In certain types of training devices, information is stored on magnetic tape. This information may represent audio signals or pulse signals and is recorded and stored onto different channels of a magnetic tape. In reproducing this channel information, it is necessary to maintain the phase relationship between these different channels exactly as recorded thereon.

The present invention provides a system for maintaining such an exact phase relationship.

It is therefore an object of the instant invention to provide a device for maintaining the phase relationship between two or more channels of an information storage recording medium.

Another object of the instant invention is to provide a novel electronic system for correcting the phase shifts between two or more channels of an information storage magnetic tape medium for correction of skew effects due to recording-reproducing mechanisms.

Still another object of the instant invention is to provide a novel electronic system for skew correction in a magnetic tape information storage recording medium which is simple in design and easy to build.

Yet another object of the instant invention is to provide a novel electronic skew correction system for use in a magnetic tape information storage system which maintains phase relationships between a multiplicity of information channels recorded on magnetic tapes.

Other objects and many of the attendant advantages of this invention will be readily appreciated as the same becomes better understood by reference to the following detailed description when considered in connection with the single drawing which is a schematic block diagram of a preferred embodiment of the instant invention.

Referring now to the drawing, the skew correction system uses delay lines. These delay lines are varied and controlled electronically. Magnetic tape 10 is driven past recording heads 12 and 14 on which is recorded equal magnitude sine-wave signals 90° out of phase with each other. These equal magnitude sine-wave signals are in addition to the information signals which are also recorded onto the magnetic tape 10. The channels containing information are shown as channels A, B, C, D, E and F on the drawing. The two outside channels on which the referenced sine-wave signals are recorded by recording heads 12 and 14 do not contain any channel information but merely contain the information for correcting the skew of the tape. The 90° sine-wave reference signal is generated by a sine-wave generator 15. The output of the sine-wave generator is fed into the 90° phase-shifter 16 which shifts the phase of the input sine-wave reference signal by 90° for use on channels 12 and 14 (information channels A and F). The channel information contained in channels B, C, D and E are fed into variable delay lines, respectively 18, 20, 22, 24 and 26. The reference sine-wave signals which are recorded on the two outside channels (A and F), are fed into the skew correcting circuitry. The reference A signal in channel A is fed into impedance matching cathode follower 28. The output from this cathode follower 28 is fed into an electrically variable delay line 30. The reference signal on channel F is fed into a fixed delay line 32 and from there into a phase detector comparator 34. The outputs from the electrically variable delay line 30 are also fed into the phase detector comparator 34. The phase difference between the reference signals on channels A and F which represents an error phase difference, and is caused mostly by the skew of the magnetic tape in relation to the recording and feedback heads, is detected by phase detector comparator 34, integrated by integrator 36 and applied to modulators 38 and 40 respectively. The outputs from modulators 38 and 40 respectively, are amplified by amplifiers 42 and 44 respectively, and demodulated by demodulators 46 and 48 respectively. The output from phase detector comparator 34 is a varying DC signal. This is integrated by integrator 36. Oscillator means 43 provides a carrier signal for modulators 38 and 40. The error output from integrator 36 is used to modulate this carrier signal by modulators 38 and 40. The modulator signal is fed to amplifiers 42 and 44 and demodulators 46 and 48 to form an error signal in error summer 50.

The modulators and demodulators, in a preferred embodiment of the invention, are choppers. The summer 50, in a preferred embodiment of the invention, is a parallel resistance summer. The summed output from summer 50 is applied to electrically variable delay line 30 and at the same time to channels, B, C, D, E and F, respectively 18, 20, 22, 24 and 26 in the correct magnitude, to automatically control the amount of delay applied to each of the channel output signals so that the output information at point 52 is maintained in correct phase relation for the error feedback from summer 50 through electrically variable delay line 30 to phase detector 34, integrator 36, modulators 38 and 40, amplifiers 42 and 44 and demodulators 46 and 48. The electrically variable delay line 30 and the variable delay lines, respectively 18, 20, 22, 24 and 26 are standard commercial items and for this reason are not further described herein.

The above description and the FIGURE show that with the use of simplified circuitry and a novel system the skew from a multiple channel tape storage system can be controlled, to maintain a constant phase relationship between a large number of channels recorded thereon. The novel system of this invention can also be utilized in film recording systems or any other type of system wherein a multiplicity of parallel channels have recorded thereon information which must be kept in exact phase relationships.

Obviously many modifications and variations of the present invention are possible in the light of the above teachings. It is therefore to be understood that within the scope of the appended claims the invention may be practiced otherwise than as specifically described.

What is claimed is:

1. An electronic skew correction system, comprising in combination;
   - recording means and playback means, said recording means having a capability of receiving and storing information in a multiplicity of information channels and said playback means having an ability for reproducing said stored information,
   - information storage means, said information storage means being operatively connected to said recording and playback means for storage of information on a multiplicity of information channels, synchronizing means, operatively connected to said recording and playback means, synchronizing signal generating means, said synchronizing signal generating means being operatively connected to said recording means whereby said synchronizing signal generating means generates synchronizing signals for storage upon said information storage means, and phase shift control means, said phase shift control means being operatively to said playback means for control of the information reproduced from the information stored on said storage means whereby said phase shift control means vary the various channel phase relations of the information reproduced, and wherein said synchronizing generator means includes, a sine wave oscillator, and phase shift means, said sine wave oscillator being connected to generate a reference sine wave signal for recording onto one of the external information channels of said tape information storage means, and said phase shift means being operatively connected to said reference signal generating means for shifting the phase of said reference signal for the production of equal amplitude signals ninety degrees out of phase with said reference signal for recording on another one of the external channels of said information storage recording means.

2. The combination of claim 1 wherein said phase-shift control means comprises;

error signal detection means, said error signal detection means being operatively connected to said playback means for detection of the phase error between said ninety degree phase-shifted reference signal and said reference signal recorded on the external channels of said information recording medium, thereby providing an error correction signal proportional to said phase error, voltage divider means, said voltage divider means being operatively connected to the output of said error detector means for dividing said error signal into amplitudes proportional to the position of the channel recorded on said information storage means, feedback means, said feedback means being operatively connected to the output of said error detector means for control of said error correction signal, and control means, said control means being operatively connected to said voltage divider means and operatively connected to the outputs of each information channel recorded upon said information storage means, whereby the output signal from said error detector means controls the phase shift of said control means for control of the information channel phase relations.

3. The combination of claim 2 wherein said feedback error detecting means comprises;

a fixed delay line and an electrically variable delay line, each of said delay lines being respectively connected to the output of said external synchronizing signal recording channels, phase detector means, said phase detector means being operatively connected to the outputs of said fixed delay line and said electrically variable delay line for detection of phase difference between said signals, integrating means, said integrating means being operatively connected to the output of said phase detection means for integration of signals generated therein, amplifier-modulation and demodulation means, said amplifiermodulation and demodulation means being operatively connected to the output of said integration means for production of an error signal representing the phase difference between said synchronizing signals recorded on the external channels of said information storage means, error summing means, said error summing means being connected to the output of said amplifier-modulator and demodulation means for summing the errors detected between said externally recorded synchronizing signal channels, the output of the error summer being applied both to said electrically variable delay line and to said voltage divider means whereby the output from said voltage divider means controls said control means in accordance with the detected error correction signal.

4. The combination of claim 3 wherein said control means comprises one electrically variable delay line for each recorded information channel.

5. The combination of claim 4 wherein said amplifier-modulation and demodulation means comprise;

means for generating a reference carrier signal, chopper means, coupled to said means for generating a reference carrier signal, for modulating said integrated signals by said reference carrier signal, said chopper means being connected to the output of said integrator means, amplifier means for amplifying said modulated signals, and means for demodulating said amplifier signals, said demodulating means being operatively connected to the output of said amplifier means.

* * * * *